United States Patent [19]

Greenfield et al.

[11] Patent Number: 5,001,972
[45] Date of Patent: Mar. 26, 1991

[54] CHEESE BLOCK FORMER

[75] Inventors: Robert A. Greenfield, Tauranga, New Zealand; Peter B. Barlow, Stoke-Sub-Hamdon, England

[73] Assignee: Alfa-Laval Cheese Systems Limited, Somerset, United Kingdom

[21] Appl. No.: 541,475

[22] PCT Filed: Mar. 22, 1988

[86] PCT No.: PCT/GB88/00220
§ 371 Date: Nov. 8, 1988
§ 102(e) Date: Nov. 8, 1988

[87] PCT Pub. No.: WO88/07322
PCT Pub. Date: Oct. 6, 1988

[30] Foreign Application Priority Data

Mar. 26, 1987 [GB] United Kingdom ............... 8707313

[51] Int. Cl.⁵ .................... A01J 11/06; A01J 25/11
[52] U.S. Cl. .................... 99/454; 99/456; 99/458
[58] Field of Search .................. 99/452–454, 99/456, 458, 459, 460, 465, 472; 426/486, 491, 478, 517

[56] References Cited

U.S. PATENT DOCUMENTS 2,982,655  5/1961  Budd et al.
3,468,026  9/1969  Robertson et al.
3,982,480  9/1976  Kamphuis ............... 99/456
4,137,836  2/1979  Megard ................... 99/454
4,539,902  9/1985  Brockwell et al. ....... 99/454

FOREIGN PATENT DOCUMENTS

1541836  3/1979  United Kingdom.
1542844  3/1979  United Kingdom.

Primary Examiner—Timothy F. Simone
Attorney, Agent, or Firm—Davis Hoxie Faithfull & Hapgood

[57] ABSTRACT

Cheese curd is compressed into blocks by feeding the curd into the top of a hollow tower having a perforated lining while the tower is at a sub-atmospheric pressure to form a pillar of curd supported on a guillotine blade at the bottom of the tower, the guillotine blade is then withdrawn, the pillar of curd lowered by an elevator, and the guillotine blade returned to the closed position so as to cut off a block of curd from the bottom of the pillar of curd. The tower comprises a tubular casing, and the perforated lining comprises a pre-form tube formed as an integral structure prior to the fitting of the tube into the tower. The tube is spaced from the wall of the tower to form a drainage passage for whey pressed out from the curd in the pillar by the weight of superimposed curd, the whey passing into the drainage passage through apertures in the tube.

9 Claims, 4 Drawing Sheets

CHEESE BLOCK FORMER

This is a continuation of co-pending application Ser. No. 07/271,780 filed on Nov. 8, 1988 abandoned.

FIELD OF THE INVENTION

This invention relates to cheese-making, and is concerned more particularly with the formation of blocks of compressed natural cheese from cheese curd which has been cut into small pieces, cubes, slices or chips, or broken up into granular curd, and mixed with salt and/or any other desired additive to form prepared cheese curd.

DESCRIPTION OF THE PRIOR ART

An increasing volume of cheese is being manufactured commercially by forming blocks of natural cheese from prepared cheese curd in apparatus of the type comprising a hollow tower having an opening at the bottom thereof, the tower being fitted internally with a perforated lining defining a tubular column above said opening, the lining co-operating with the wall of the tower to form a drainage passage therebetween, a guillotine movable between a closed position closing the lower end of the column and an open position in which the lower end of the column is open, vacuum means for creating a sub-atmospheric pressure in the tower and column, means for introducing prepared cheese curd into the upper end of the tower to build up a pillar of curd in the column while the tower is at a sub-atmospheric pressure, the whey expressed from the lower end of the pillar of curd due to the weight of the curd superimposed thereon passing through the perforations in the lining and into said drainage passage, and an elevator positioned below the tower and operable to lower the pillar of curd when the guillotine is in the open position so that the lower end portion of the pillar of curd projects out of the lower end of the column, the guillotine being operable to cut a block of cheese from the lower end of the pillar of curd upon movement of the guillotine into the closed position. Apparatus of this type, which is known as a cheese block former, is described and illustrated in British patent specifications Nos. 1187964 and 1542844.

In previous known apparatus of this type, the tower, which is approximately sixteen feet in height, comprises four separate stainless steel walls, namely a front wall having forwardly projecting flanges at the longitudinal edges thereof, a rear wall having rearwardly projecting flanges at the longitudinal edges thereof, and two side walls bolted to the flanges on the front and rear walls. The side walls also have flanges at the longitudinal edges thereof to increase the rigidity of the tower. The perforated lining is formed from four perforated drainage plates namely two side drainage plates each having the longitudinal margins thereof clamped between the adjacent side wall of the tower and the adjacent flanges on the front and rear walls of the tower, and front and rear drainage plates engaged against the front and rear walls respectively of the tower and secured thereto only at the top and bottom thereof. Gaskets are interposed between the longitudinal margins of each side drainage plate and the adjacent side wall of the tower and between the longitudinal margins of the each side drainage plate and the adjacent flanges on the front and rear walls of the tower. Each drainage plate is formed from thin stainless steel plate having a thickness of approximately 0.56 mm, the perforations being formed in each plate by punching portions of the plate out of the plane of the plate to one side thereof to form a parallel strips the ends of which are integral with the remainder of the plate but the centre portions of which are spaced from the plate to form narrow slots between the plate and the side edges of the centre portions of the strips. Drainage plates of this construction are described and illustrated in British patent specification No. 1541836. The drainage plates are mounted in the tower with the punched out portions engaged flat against the walls of the tower so that the remainder of each plate is spaced from the tower to form the drainage passage for whey.

The known apparatus described above has performed satisfactorily for many years, but it is difficult to clean the interior of the tower, particularly at the junctions between the walls and inspection inside the tower is extremely difficult.

SUMMARY OF THE INVENTION

According to the present invention there is provided apparatus of the type described, wherein the perforated lining in the tower comprises a preformed tube which extends substantially the full length of the tower, the tube being formed as an integral structure prior to fitting of the tube into the tower.

In the apparatus of the invention the lining tube can be spaced from the junctions of the walls of the tower, and can conveniently be spaced entirely from the tower walls over substantially the full length of the tower, thereby facilitating cleaning. Moreover the tower can also comprise a preformed tubular casing formed as an integral structure, conveniently by welding together the thick steel plates designed to form the walls of the tower, prior to the fitting of the lining tube in the tower. Such a construction requires no maintenance other than cleaning, and is much more sanitary than the previous known construction consisting of separate wall sections bolted together with gaskets which are liable to become contaminated.

The apparatus of the invention has the further advantage over the prior known apparatus that the lining tube which is formed as an integral structure is inherently stronger than a tubular lining formed of separate plates within the tower and is therefore better able to withstand fluctuating pressures and movement without suffering metal fatigue. It is of course essential to avoid any risk of metal fatigue since otherwise particles of metal could break off and become embedded in the cheese.

The apparatus of the present invention enables use of a lining tube with a wall thickness substantially greater than that of the drainage plates used in previous known constructions. Hitherto, it has been believed that it was necessary for the perforations in the lining to be in the form of narrow slots, and that such slots could only be produced economically by punching out portions of very thin plate, as described above. It has however now been found that satisfactory whey drainage can be obtained with apertures in a relatively thick-walled lining tube. The apertures in the lining tube preferably each comprises an inner cylindrical bore which opens through the internal surface of the lining tube an outer cylindrical bore which opens through the external surface of the lining tube, the outer bore being coaxial with the inner bore and having a substantially larger diameter than that of the inner bore, and a flared bore between the inner and outer cylindrical bores, the wall of the flared bore merging into the walls of the cylindrical bores.

The lining tube preferably has internal cross sectional dimensions which increase progressively in the direction towards the lower end of the tower. This construction facilitates downward movement of the pillar of curd within the lining tube.

In a preferred construction of the apparatus of the invention the tower is detachably mounted on a support ring which is in turn detachably mounted on a hollow base, and the lining tube has the lower end portion thereof mounted on the support ring radially inwards of the tower and the upper end thereof detachably secured to the top of the tower. The side wall of the tower at the top thereof can conveniently be turned inwardly to form a flange and the wall of the lining tube at the top thereof turned radially outwards to form a flange which is detachably secured to the flange on the tower.

BRIEF DESCRIPTION OF THE DRAWINGS

One construction of apparatus for forming blocks of natural cheese from prepared cheese curd is illustrated, by way of example, in the accompanying drawings.

DESCRIPTION OF THE PREFERRED EMBODIMENT

Figures 1, 6:
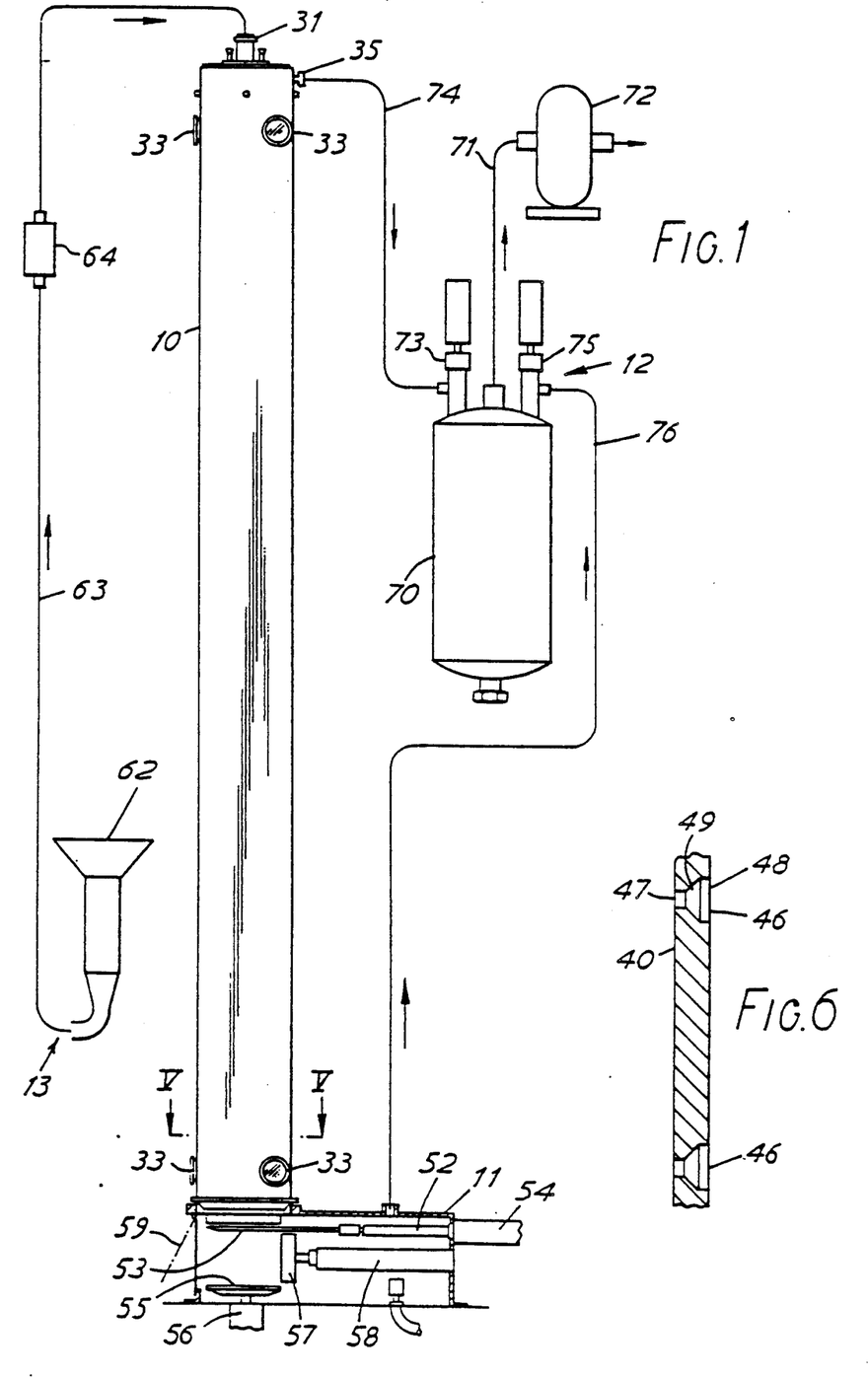
FIG. 1 is an elevation view of the apparatus with the hollow base below the tower shown in section.
FIG. 6 is a sectional view of part of the lining tube taken along the line VI—VI in FIG. 2.

Referring to FIG. 1, the apparatus comprises a hollow tower 10 mounted on a hollow base 11, a vacuum installation 12 for extracting air from the tower and base, and a feed device 13 for feeding prepared cheese curd into the top of the tower.

Figure 2:
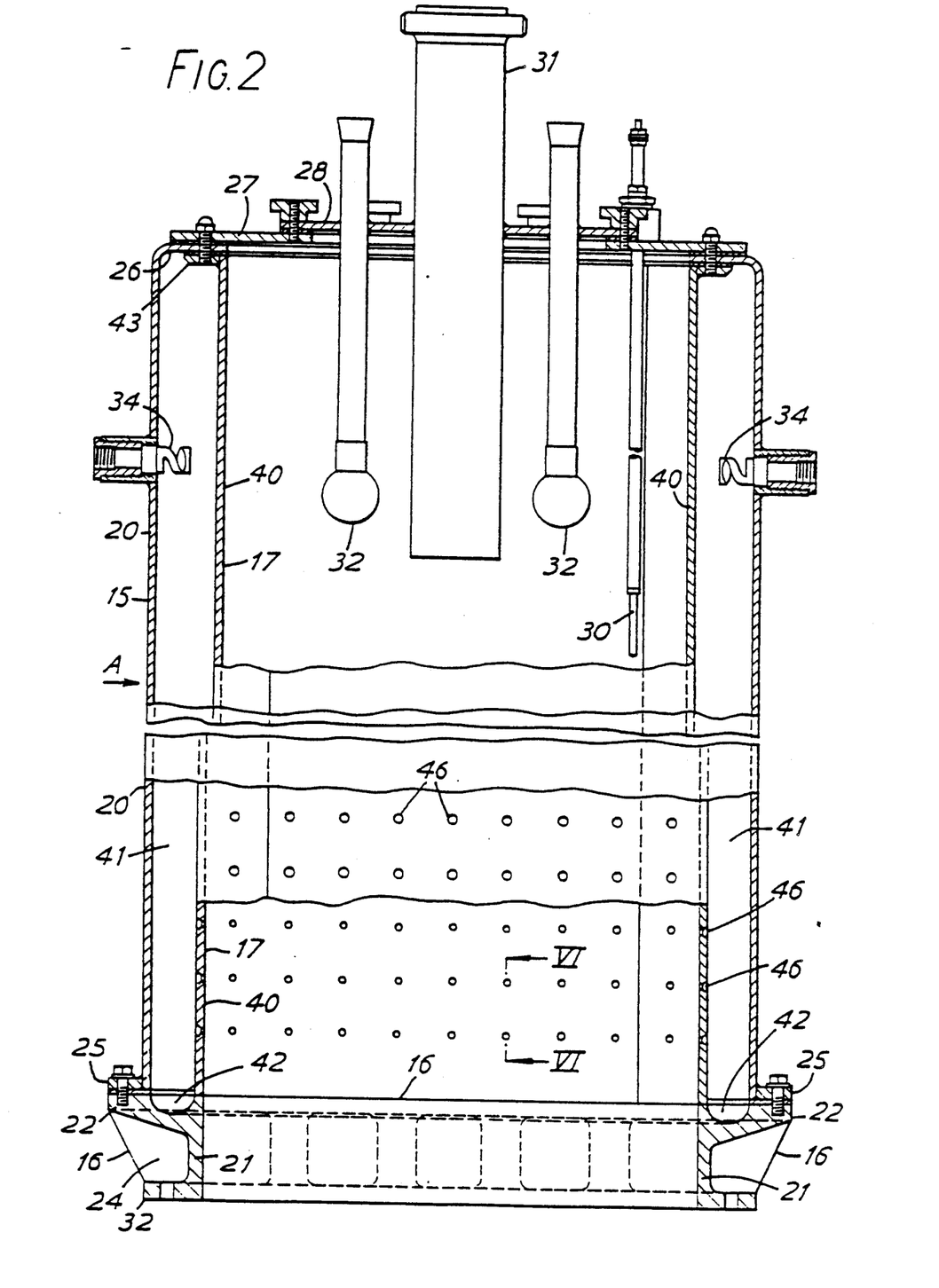
FIG. 2 is a sectional view of the top and bottom portions of the tower and lining tube on a larger scale.
Figure 3:
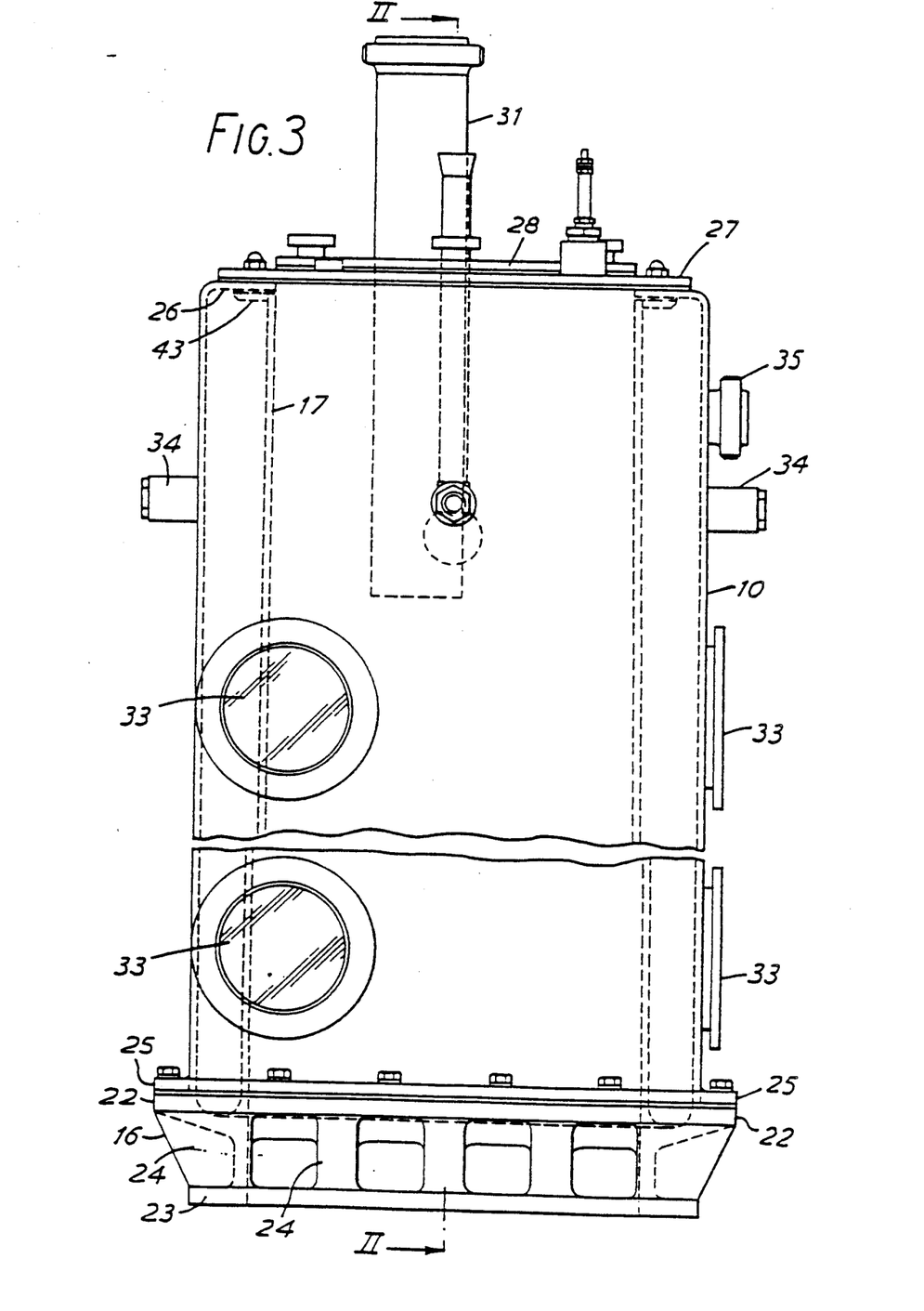
FIG. 3 is an elevation view of the top and bottom portions of the tower, taken in the direction of arrow A in FIG. 2.

As shown in FIGS. 2 and 3, the tower comprises a long tubular casing 15 mounted on a support ring 16 and a lining tube 17 is mounted inside the casing 15. The long tubular casing 15 is of rectangular cross section with side walls 20 which are substantially parallel to the axis of the tower. The support ring 16 is also of rectangular cross section and comprises thick side walls 21, an outwardly projecting upper flange 22, an outwardly projecting lower flange 23, and a plurality of vertical webs 24 extending between the flanges 22, 23 and the side walls 21. The lower end of the casing 15 has a flange 25 bolted to the upper flange 22 on the support ring 16, and the lower flange 23 of the support ring is bolted to a corresponding flange (not shown) on the hollow base 11. The upper end of the outer casing 15 is turned inwards to form a flange 26 and the top of the tower is closed by two superimposed plates 27, 28 the plate 27 being formed with a central aperture and being bolted to the flange 26 and the plate 28 being bolted to the plate 27. The plate 27 carries a probe 30 for sensing the level of curd in the tower, and the plate 28 carries an inlet tube 31 for feeding curd into the tower and two spray balls 32 for C.I.P. (Clean-in-Place) systems. At the upper end portion of the tower, the side walls 20 of the outer casing are fitted with two sight glasses 33, C.I.P. spray devices 34 and an outlet 35 connected to the vacuum installation. Two further sight glasses 33 are fitted in the side walls 20 of the outer casing at the lower end portion of the tower.

The lining tube 17 is a pre-formed integral structure which is fitted as a unit into the tower. The lining tube 17 is of rectangular cross section with side walls 40 which are inclined outwards at a small angle relative to the axis of the tower in the downwards direction, so that the internal cross sectional dimensions of the lining tube 17 increase progressively in the direction towards the lower end of the lining tube. The overall cross sectional dimensions of the lining tube 17 are however substantially smaller than the corresponding cross sectional dimensions of the outer casing 15 of the tower, so that the lining tube 17 co-operates with the casing 15 to define a drainage passage 41 for whey. The upper end of the lining tube 17 is provided with an outwardly projecting flange 43 which is bolted to the underside of the flange 26 on the upper end of the outer casing 15 of the tower. The lower end of the lining tube 17 has internal dimensions equal to those of the support ring 16, and the lining tube 17 is mounted on the support ring 16 with the internal surfaces of the tube 17 flush with the internal surfaces of the support ring 16. The lower surface of the upper flange on the support ring is inclined downwards in the radially inwards direction, and the upper surface of the support ring between the lower ends of the lining tube 17 and the casing 15 is formed with a trough 42 extending around the periphery of the support ring. The upper flange of the support ring is formed with ports (not shown) for draining whey from the trough 42.

The side walls of the lining tube 17 are formed with drainage apertures 46 as shown in FIG. 6, the apertures being spaced apart over the entire area of the lining tube except for the upper portion thereof. Each aperture 46 comprises a cylindrical bore 47 which opens through the internal surface of the wall of the lining tube, a cylindrical bore 48 co-axial with bore 47 which opens through the external surface of the wall of the lining tube, the diameter of the bore 48 being substantially larger than that of the bore 47, and a flared bore 49 between the cylindrical bores 47, 48, the wall of the flared bore merging into the walls of the cylindrical bores.

The tower is assembled by first welding the lower end of the lining tube 17 to the upper end of the support ring 16, inserting the lining tube into the outer casing 15 of the tower, and then bolting together the flanges 26, 43 and the flanges 22, 25. The complete tower is then mounted as an air-tight fit on the hollow base 11.

The hollow base 11 is fitted with a guillotine 52 comprising a blade 53 and a piston and cylinder motor 54 operable to move the blade between a closed position in which it closes off the support ring 16 on the lower end of the lining tube 17 and an open position in which the blade is withdrawn wholly clear of the support ring. The hollow base 11 is also fitted with an elevator 55 positioned directly below the support ring, the elevator being operable by a piston and cylinder motor 56 and adapted to lower a pillar of curd in the lining tube and support ring, and an ejector ram 57 in the hollow base is operable by a piston and cylinder motor 58 to eject a block of cheese on the elevator through a door 59 in the side of the base 11.

The feed device 13 comprises a hopper 62 for storage of prepared curd, a feed pipe 63 extending between the hopper and the upper end of the tower, and a valve 64 for controlling flow of curd through the pipe 63. The outlet end of the feed pipe 63 is sealed in the inlet tube 31 in the top of the tower. The tube 31 is arranged to direct curd downwardly into the lining tube 17.

The vacuum installation 12 comprises a large vacuum reservoir 70 connected directly by a pipe 71 to a vacuum pump 72 operable to maintain the reservoir at high vacuum. The reservoir is connected through a vacuum distributor valve 73 and a pipe 74 to the air outlet 35 in the tower 10, and through another vacuum distributor valve 75 and a pipe 76 to the hollow base 11. The two valves 73, 75 are of conventional construction and are operable to connect the associated pipes 74, 76 selectively either to the vacuum reservoir or to atmosphere.

At the start of an operational cycle of the apparatus, the curd feed pipe 63 is closed by the valve 64, the guillotine blade 53 is in its closed position as shown in FIG. 1, the valves 73, 75 are set so that the pipes 74, 76 are connected to the vacuum reservoir 70, and the vacuum pump 72 is driven to evacuate air from the tower 10 and the hollow base 11. The hopper is filled with prepared cheese curd. When a high vacuum is obtained in the tower, the valve 64 is opened so that the difference between the low pressure in the tower and the comparatively high atmosphere pressure acting on the curd in the hopper causes the curd to flow up the pipe 63 and into the top of the tower. The curd entering the tower is of course immediately subjected to the lower pressure therein and air and moisture vapour entering with the curd is withdrawn from the tower through the pipe 74. The cheese curd falls into the lining tube 17 and builds up into a pillar of curd supported on the blade of the guillotine. The weight of curd in the lining tube compresses the curd at the lower end and forces whey out of the curd, the whey passing through the drainage apertures 46 into the drainage passage 41. The whey in the drainage passage 41 drops down into the trough 42 and is drained away through the outlet ports (not shown). When the pillar of curd has reached a predetermined height indicated by the level probe 30, the valve 64 in the curd feed pipe is closed and the valve 73 on the vacuum reservoir is connected to atmosphere so as to permit air to flow through the pipe 74 into the tower. The resulting increase in pressure in the tower compresses and consolidates the curd in the pillar. The elevator 55 in the hollow base is then raised to a position in which it is immediately below the guillotine blade 53, and the guillotine blade is withdrawn to its open position to allow the pillar of curd to drop onto the elevator 55. The small outward inclination of the walls of the lining tube 17 in the downward direction, as explained above, reduces the frictional resistance between the walls of the lining tube and the curd during downward movement of the pillar of curd. The pillar of curd is then lowered slowly by the elevator a distance corresponding to the desired depth of a block of cheese, and the guillotine blade driven back into its closed position so as to sever a block of cheese from the lower end of the pillar of curd. The pipe 76 is then connected to atmosphere to release the vacuum in the hollow base 11, the door 59 is opened, and the block of cheese ejected through the door by the ram 57.

We claim:

1. Apparatus for forming blocks of natural cheese from prepared cheese cured, comprising a hollow tower having an opening at the bottom thereof, the tower being fitted internally with a perforated lining defining a tubular column above said opening, the lining co-operating with the tower to form a drainage passage therebetween, a guillotine movable between a closed position closing a lower end of the column and an open position in which the lower end of the column is open, vacuum means for creating a sub-atmospheric pressure in the tower and column, means for introducing prepared cheese curd into an upper end of the tower to build up a pillar of curd in the column while the tower is at sub-atmospheric pressure, whey expelled from the lower end of the pillar of curd due to the weight of the curd superimposed thereon passing through the perforations in the lining and into said drainage passage, and an elevator positioned below the tower and operable to lower the pillar of curd when the guillotine is in the open position so that the lower end portion of a pillar of curd projects out of the lower end of said column, the guillotine being operable to cut a block of cheese from the lower end of the pillar of curd upon movement of the guillotine into the closed position, wherein the perforated lining in the tower comprises a preformed lining tube which extends substantially the full length of the tower, the lining tube being formed as an integral structure prior to fitting of the lining tube into the tower.

2. Apparatus as claimed in claim 1, wherein the tower comprises a preformed tubular casing formed as an integral structure prior to the fitting of the lining tube therein.

3. Apparatus as claimed in claim 1, wherein the lining tube is spaced from the walls of the tower over substantially the full length of the tower.

4. Apparatus as claimed in claim 1, wherein the lining tube has internal cross sectional dimensions which increase progressively in the direction towards the lower end of the tower.

5. Apparatus for forming blocks of natural cheese from prepared cheese curd, comprising a hollow tower having an opening at the bottom thereof, wherein the tower comprises a tubular casing of rectangular section with side walls which are substantially parallel to the axis of the tower, the tower being fitted internally with a perforated lining defining a tubular column above said opening, the lining co-operating with the tower to form a drainage passage therebetween, the lining having a rectangular section with side walls which are inclined outwardly at a small angle relative to the axis of the tower in the downwards direction, a guillotine movable between a closed position closing a lower end of the column and an open position in which the lower end of the column is open, vacuum means for creating a sub-atmospheric pressure in the tower and column, means for introducing prepared cheese curd into an upper end of the tower to build up a pillar of curd in the column while the tower is at a sub-atmospheric pressure, whey expelled from the lower end of the pillar of curd due to the weight of the curd superimposed thereon passing through the perforations in the lining and into said drainage passage, and an elevator positioned below the tower and operable to lower the pillar of curd when the guillotine is in the open position so that the lower end portion of a pillar of curd projects out of the lower end of said column, the guillotine being operable to cut a block of cheese from the lower end of the pillar of curd upon movement of the guillotine into the closed position, wherein the perforated lining in the tower comprises a preformed lining tube which extends substantially the full length of the tower, the lining tube being formed as an integral structure prior to fitting of the lining tube into the tower and the lining tube having internal cross-sectional dimensions which increase progressively in the direction towards the lower end of the tower.

6. Apparatus for forming blocks of natural cheese from prepared cheese curd, comprising a hollow tower having an opening at the bottom thereof, wherein the tower is detachably mounted on a support ring which is in turn mounted on a hollow base, the tower being fitted internally with a perforated lining defining a tubular column above said opening, the lining co-operating with the tower to form a drainage passage therebetween, the lining having the lower end thereof mounted on the support ring radially inwards of the tower and the upper end thereof detachably secured to the top of the tower, a guillotine movable between a closed position closing a lower end of the column and an open position which the lower end of the column is open, vacuum means for creating a sub-atmospheric pressure in the tower and column, means for introducing prepared cheese curd into an upper end of the tower to build up a pillar of curd in the column while the tower is at a sub-atmospheric pressure, whey expelled from the lower end of the pillar of curd de to the weight of the curd superimposed thereon passing through the perforations in the lining and into said drainage passage, and an elevator positioned below the tower and operable to lower the pillar of curd when the guillotine is in the open position so that the lower end portion of a pillar of curd projects out of the lower end of said column, the guillotine being operable to cut a block of cheese from the lower ned of the pillar of curd upon movement of the guillotine into the closed position, wherein the perforated lining in the tower comprises a preformed lining tube which extends substantially the full length of the tower, the lining tube being formed as an integral structure prior to fitting of the lining tube into the tower.

7. Apparatus as claimed in claim 6 wherein the wall of the tower at the top thereof is turned inwardly to form a flange and the wall of the lining tube at the top thereof is turned outwardly to form a flange which is detachably secured to the flange on the tower.

8. Apparatus as claimed in claim 6 wherein the support ring comprises a side wall the upper end of which is formed with an outwardly projecting upper flange and the lower end of which is formed with an outwardly projecting lower flange, and webs extending between the upper and lower flanges and the side wall, the lower end of the lining tube being welded to the upper end of the support ring with the internal surface of the lining tube flush with the internal surface of the support ring, the upper flange on the support ring being bolted to the lower end of the tower and the lower flange on the support ring being bolted to the hollow base.

9. Apparatus for forming blocks of natural cheese form prepared cheese curd, comprising a hollow tower having an opening at the bottom thereof, the tower being fitted internally with a perforated lining defining a tubular column above said opening, the lining co-operating with the tower to form a drainage passage therebetween, a guillotine movable between a closed position closing a lower end of the column and an open position in which the lower end of the column is open, vacuum means for creating a sub-atmospheric pressure in the tower and column, means for introducing prepared cheese curd into an upper end of the tower to build up a pillar of curd in the column while the tower is a sub-atmospheric pressure, whey expelled from the lower end of the pillar of curd due to the weight of the curd superimposed thereon passing through the perforations in the lining and into said drainage passage, and an elevator positioned below the tower and operable to lower the pillar of curd when the guillotine is in the open position so that the lower end portion of a pillar of curd projects out of the lower end of said column, the guillotine being operable to cut a block of cheese form the lower end of the pillar of curd upon movement of the guillotine into the closed position, wherein the perforated lining in the tower comprises a preformed lining tube which extends substantially the full length of the tower, the lining tube being formed as an integral structure prior to fitting of the lining tube into the tower, and wherein the perforations in the lining tube comprise an inner cylindrical bore which opens through the internal surface of the lining tube, an outer cylindrical bore which opens through the external surface of the lining tube, the outer bore being coaxial with the inner bore and having a substantially larger diameter than that of the inner bore, and a flared bore between the cylindrical bores, the wall of the flared bore merging into the walls of the cylindrical bores.

* * * * *

UNITED STATES PATENT AND TRADEMARK OFFICE
CERTIFICATE OF CORRECTION

PATENT NO. : 5,001,972

DATED : March 26, 1991

INVENTOR(S) : Robert A. Greenfield and Peter B. Barlow

It is certified that error appears in the above—identified patent and that said Letters Patent is hereby corrected as shown below:

Col. 5, line 66, delete "cured" and substitute --curd--.

Col. 7, line 24, delete "de" and substitute --due--.

Col. 8, line 11, delete "form" and substitute --from--.

Col. 8, line 31, delete "form" and substitute --from--.

Figure 4:
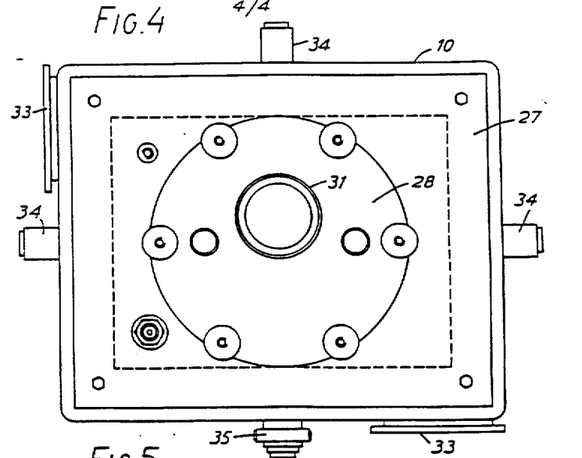
FIG. 4 is a plan view of the tower.
Figure 5:
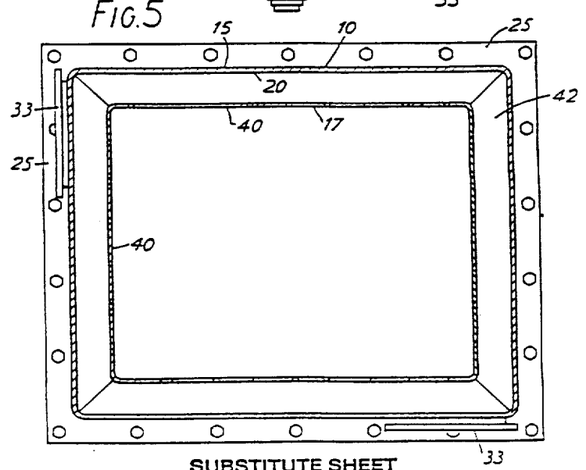
FIG. 5 is a sectional view of the tower and lining tube taken along the line V—V in FIG. 1.
Figure 6:
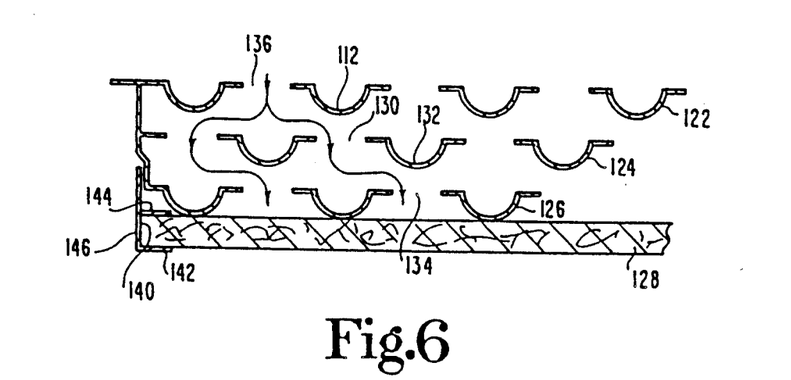
Figure 7:
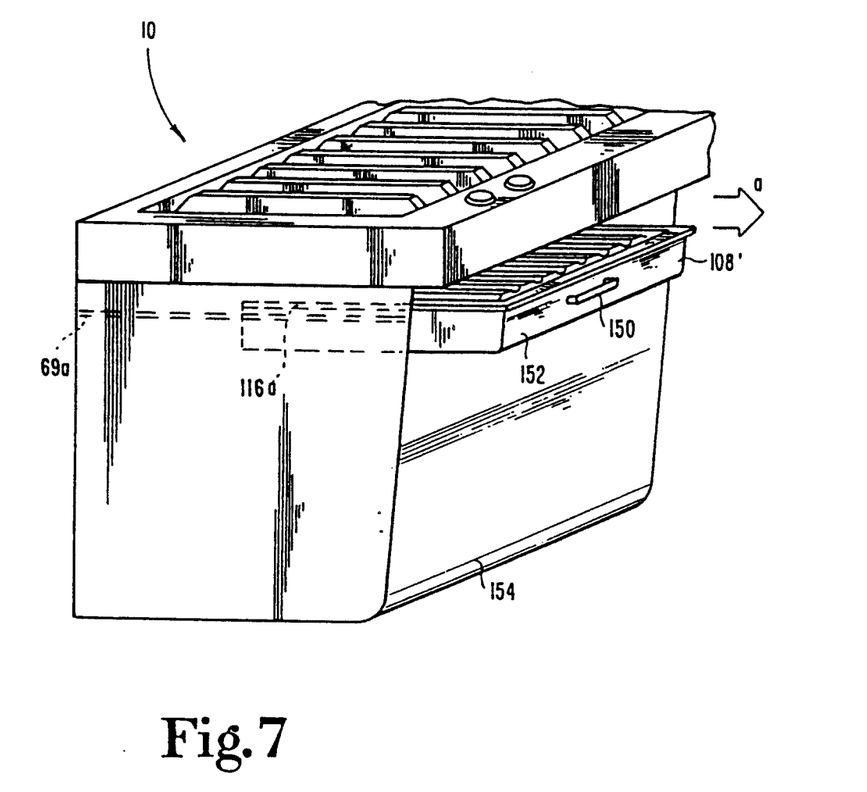

Delete sheet 1 of the drawing, containing Figs. 6 and 7 and add a new sheet containing Figs. 4 and 5, as attached hereto.

Signed and Sealed this

Twenty-ninth Day of December, 1992

Attest:

DOUGLAS B. COMER

*Attesting Officer*  *Acting Commissioner of Patents and Trademarks*

FIG.4

FIG.5